(12) United States Patent
Gao et al.

(10) Patent No.: US 11,281,536 B2
(45) Date of Patent: Mar. 22, 2022

(54) METHOD, DEVICE AND COMPUTER PROGRAM PRODUCT FOR MANAGING STORAGE SYSTEM

(71) Applicant: EMC IP Holding Company LLC, Hopkinton, MA (US)

(72) Inventors: Jian Gao, Beijing (CN); Geng Han, Beijing (CN); Jamin Jianbin Kang, Beijing (CN); Hongpo Gao, Beijing (CN); Shaoqin Gong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 189 days.

(21) Appl. No.: 16/021,276

(22) Filed: Jun. 28, 2018

(65) Prior Publication Data

US 2019/0004899 A1 Jan. 3, 2019

(30) Foreign Application Priority Data

Jun. 30, 2017 (CN) .......................... 201710525356.0

(51) Int. Cl.
*G06F 11/00* (2006.01)
*G06F 11/10* (2006.01)
*G06F 11/20* (2006.01)
*G06F 3/06* (2006.01)

(52) U.S. Cl.
CPC .......... *G06F 11/1092* (2013.01); *G06F 3/061* (2013.01); *G06F 3/0614* (2013.01); *G06F 3/0685* (2013.01); *G06F 11/1088* (2013.01); *G06F 11/2094* (2013.01); *G06F 3/0604* (2013.01); *G06F 3/0631* (2013.01); *G06F 3/0632* (2013.01); *G06F 3/0689* (2013.01)

(58) Field of Classification Search
CPC ............ G06F 11/1088; G06F 11/1092; G06F 11/1662; G06F 11/2094; G06F 3/0604; G06F 3/061; G06F 3/0614; G06F 3/0631; G06F 3/0632; G06F 3/0685; G06F 3/0689
See application file for complete search history.

(56) References Cited

U.S. PATENT DOCUMENTS

| 8,006,061 | B1 | 8/2011 | Chatterjee et al. |
| 8,086,893 | B1 * | 12/2011 | MacFarland ........ G06F 11/1088 714/3 |
| 8,566,553 | B1 | 10/2013 | Marshak et al. |

(Continued)

OTHER PUBLICATIONS

Gaidhani, Hemant, Speeds, Feeds and Needs—Understanding SSD Endurance, Western Digital, 2015 (retrieved from Wayback Machine capture on Jan. 10, 2018) (Year: 2015).*

*Primary Examiner* — Marc Duncan
(74) *Attorney, Agent, or Firm* — BainwoodHuang

(57) ABSTRACT

Embodiments of the present disclosure relate to a method, device and a computer program product for managing a storage system. The storage system includes a disk array. A method includes determining, based on a first number of disks in the disk array, a second number of spare disks for the disk array. The method further includes creating a spare disk array with the second number of spare disks. The method further includes, in response to a first disk in the disk array failing, allocating a spare logic storage unit from the spare disk array for rebuilding the first disk. In addition, the method further includes rebuilding the first disk with the spare logic storage unit.

23 Claims, 6 Drawing Sheets

(56) References Cited

U.S. PATENT DOCUMENTS

| | | |
|---|---|---|
| 8,694,724 B1 | 4/2014 | Linnell et al. |
| 8,880,801 B1 | 11/2014 | Robins et al. |
| 9,037,795 B1 | 5/2015 | Linnell et al. |
| 9,128,910 B1 | 9/2015 | Dayal |
| 9,256,381 B1 | 2/2016 | Fultz et al. |
| 9,311,207 B1 | 4/2016 | Marshak et al. |
| 9,378,093 B2 * | 6/2016 | Cooper ............... G06F 11/1092 |
| 9,459,809 B1 | 10/2016 | Chen et al. |
| 9,507,887 B1 | 11/2016 | Wang et al. |
| 9,990,263 B1 * | 6/2018 | Tian .................... G06F 11/1092 |
| 2006/0143503 A1 * | 6/2006 | Shaik ..................... G06F 3/061 |
| | | 714/6.2 |
| 2006/0161823 A1 * | 7/2006 | Sato .................... G06F 11/1092 |
| | | 714/710 |
| 2007/0088990 A1 * | 4/2007 | Schmitz .............. G06F 11/1088 |
| | | 714/700 |
| 2008/0168228 A1 | 7/2008 | Carr et al. |
| 2008/0288714 A1 | 11/2008 | Salomon et al. |
| 2010/0023685 A1 * | 1/2010 | Ikejiri ................... G06F 1/3221 |
| | | 711/114 |
| 2010/0077252 A1 | 3/2010 | Siewert et al. |
| 2010/0199036 A1 | 8/2010 | Siewert et al. |
| 2011/0010514 A1 | 1/2011 | Benhase et al. |
| 2012/0042211 A1 | 2/2012 | Brown et al. |
| 2012/0059978 A1 | 3/2012 | Rosenband et al. |
| 2012/0110252 A1 | 5/2012 | McKean |
| 2013/0205088 A1 | 8/2013 | Benhase et al. |
| 2014/0173199 A1 | 6/2014 | Gupta et al. |
| 2014/0325262 A1 | 10/2014 | Cooper et al. |
| 2018/0039412 A1 * | 2/2018 | Singh ..................... G06F 3/061 |

\* cited by examiner

METHOD, DEVICE AND COMPUTER PROGRAM PRODUCT FOR MANAGING STORAGE SYSTEM

RELATED APPLICATIONS

This application claim priority from Chinese Patent Application Number CN201710525356.0, filed on Jun. 30, 2017 at the State Intellectual Property Office, China, titled "METHOD, APPARATUS AND COMPUTER PROGRAM PRODUCT FOR MANAGING A STORAGE SYSTEM" the contents of which is herein incorporated by reference in its entirety.

FIELD

Embodiments of the present disclosure generally relate to the field of data storage, and more specifically, to method, device and computer program product for managing a storage system.

BACKGROUND

A storage system generally has a plurality of disks which can be organized into a disk array. For example, a Redundant Array of Independent Disks (RAID) is a data storage virtualization technology that organizes a plurality of disks into a single logic unit for the purpose of data redundancy and/or performance improvement. Taking the traditional RAID5 for example, a RAID group (RG) can be bound on a set of disks and the RG will consume all the space of this set of disks to store data and parity information. Besides, generally there exists a spare disk for this RG. For the consideration of consistency of input/output (I/O) performance, this spare disk usually has the same type as the disks in this RG (for instance, a disk). When a certain disk of this RG fails, the spare disk can be selected to replace the faulty disk and all of the data on the faulty disk will be rebuilt and written into the spare disk.

As all of the writing operations for rebuilding the faulty disk are targeted for the spare disk for this RG, the writing bandwidth of the spare disk will become a bottleneck for the whole rebuilding process. Besides, during the rebuilding process, the storage system may still receive random I/O requests for the faulty RG from upper-layer applications. Since the RG is being rebuilt, the response time of such random I/O requests might be affected. In addition, a large number of such random I/O requests may also cause the rebuilding process to slow down or even be interrupted. In this case, if another disk in the RG also fails, data loss might be incurred.

SUMMARY

Embodiments of the present disclosure provide method, device and computer program product for managing a storage system.

In a first aspect of the present disclosure, there is provided a method for managing a storage system which includes a disk array. The method includes determining, based on a first number of disks in the disk array, a second number of spare disks for the disk array. The method further includes creating a spare disk array with the second number of spare disks. The method further includes, in response to a first disk in the disk array failing, allocating a spare logic storage unit from the spare disk array for rebuilding the first disk. In addition, the method further includes rebuilding the first disk with the spare logic storage unit.

In a second aspect of the present disclosure, there is provided a device for managing a storage system which includes a disk array. The device includes at least one processing unit and at least one memory. The at least one memory is coupled to the at least one processing unit and stores instructions for execution by the at least one processing unit, the instructions, when executed by the at least one processing unit, causing the device to perform acts including: determining, based on a first number of disks in the disk array, a second number of spare disks for the disk array; creating a spare disk array with the second number of spare disks; in response to a first disk in the disk array failing, allocating a spare logic storage unit from the spare disk array for rebuilding the first disk; and rebuilding the first disk with the spare logic storage unit.

In a third aspect of the present disclosure, there is provided a storage system which includes a disk array and a storage processor. The storage processor is configured to perform acts including: determining, based on a first number of disks in the disk array, a second number of spare disks for the disk array; creating a spare disk array with the second number of spare disks; in response to a first disk in the disk array failing, allocating a spare logic storage unit from the spare disk array for rebuilding the first disk; and rebuilding the first disk with the spare logic storage unit.

In a fourth aspect of the present disclosure, there is provided a computer program product which is tangibly stored on a non-volatile computer readable medium and includes machine-executable instructions, the instructions, when executed by device, causing the device to perform any steps of the method according to the first aspect of the present disclosure.

This Summary is provided to introduce a selection of concepts in a simplified form that are further described below in the Detailed Description. This Summary is not intended to identify key features or essential features of the present disclosure, nor is it intended to limit the scope of the present disclosure.

BRIEF DESCRIPTION OF THE DRAWINGS

Through the following detailed description with reference to the accompanying drawings, the above and other objectives, features, and advantages of the present disclosure will become more apparent. In the example embodiments of present disclosure, the same reference signs usually represent the same components.

DETAILED DESCRIPTION OF EMBODIMENTS

Figure 1A:
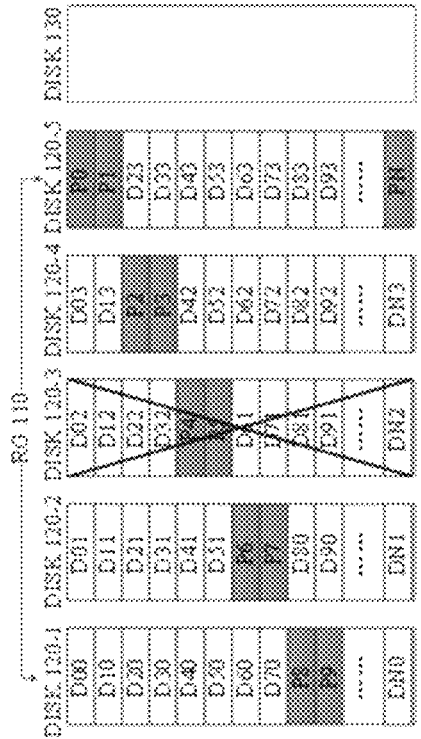
FIGS. 1A-1D are schematic diagrams illustrating a rebuilding process of a disk array group.

Preferred embodiments of the present disclosure will be described below in greater detail with reference to the drawings. Although preferred embodiments of present disclosure are displayed in the drawings, it is to be understood that the present disclosure can be implemented in various manners, not limited to the embodiments illustrated herein. On the contrary, these embodiments are provided to make the present disclosure more thorough and complete and convey the scope of the present disclosure completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "an example embodiment" are to be read as "at least one example embodiment." The term "another embodiment" is to be read as "at least one other embodiment." Terms "a first", "a second" and others can denote different or identical objects. The following text may also contain other explicit or implicit definitions.

As stated above, in a traditional disk array, when a certain disk of the disk array group fails, a spare disk can be selected to replace the faulty disk, and all of the data on the faulty disk will be rebuilt and written into the spare disk. As all of the writing operations for rebuilding the faulty disk are targeted for the spare disk, the writing bandwidth of the spare disk will become a bottleneck for the whole rebuilding process. For example, FIGS. 1A-1D illustrate schematic diagrams of the rebuilding process. In the depiction of the present disclosure, RAID 5 is used as an example of the disk array. However, it is to be understood that this is only for the ease of description, without suggesting any limitation to the scope of the present disclosure.

Figure 1B:
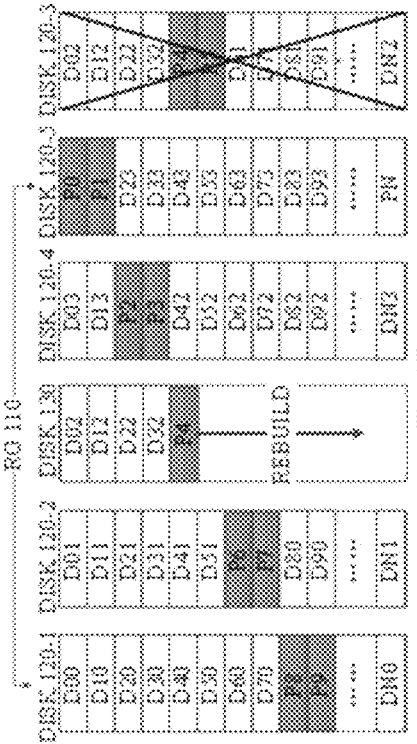
Figure 1C:
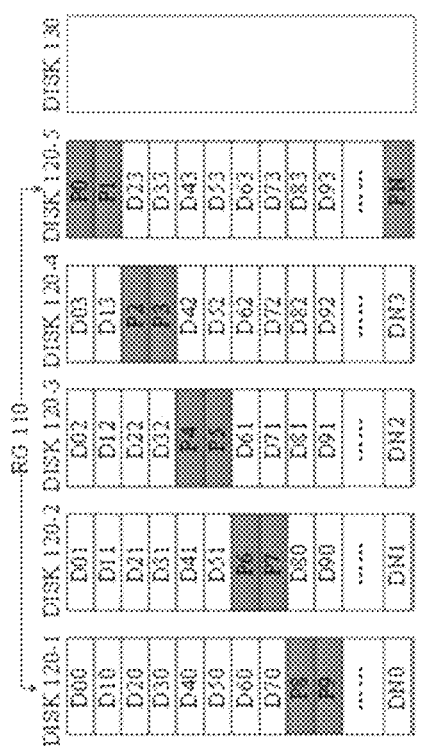
Figure 1D:
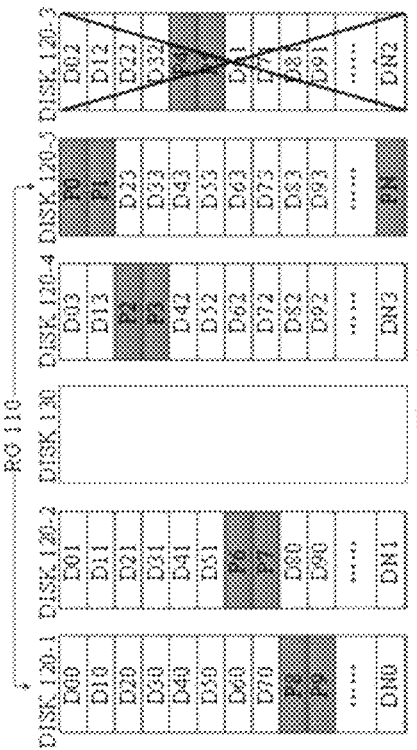

FIG. 1A illustrates a disk array group (RG) 110 of RAID 5. As shown in FIG. 1A, a RG 110 uses five disks, namely, disks 120-1, 120-2 . . . 120-5 (collectively referred to as disk(s) 120). Each stripe of the RG 110 (namely, each line in the disk array 121), for instance, may include four data extents and one parity extent (hereinafter also referred to as "4D+1P" RAID 5). As used herein, "data extents" refer to those for storing user data D00, D01, . . . , DN3, and "parity extents" refer to those for storing parity information P0, P1, . . . , PN. In addition, a disk 130 may serve as a spare disk for the RG 110, which serves for the rebuilding of a faulty disk in the RG 110. As illustrated in FIG. 1B, for instance, the disk 120-3 in the RG 110 fails. In this case, as shown in FIG. 1C, the spare disk 130 may replace the faulty disk 120-3 in the RG 110, and as shown in FIG. 1D, all of the data on the faulty disk 120-3 will be rebuilt and written into the spare disk 130.

Figure 2B:
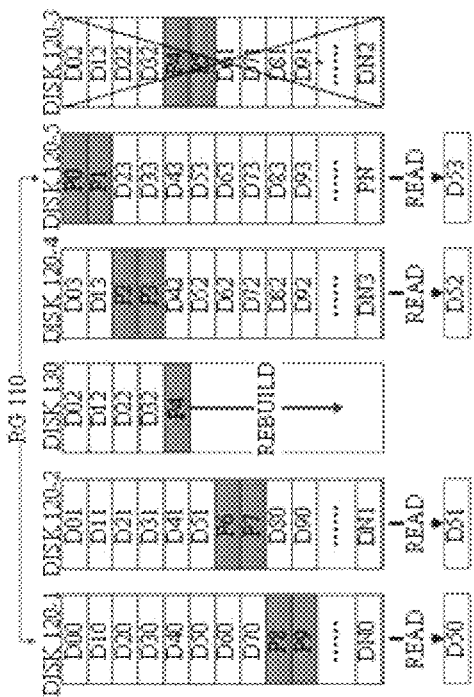
FIGS. 2A-2D are schematic diagrams illustrating specific acts in the rebuilding process.
Figure 2C:
Figure 2A:
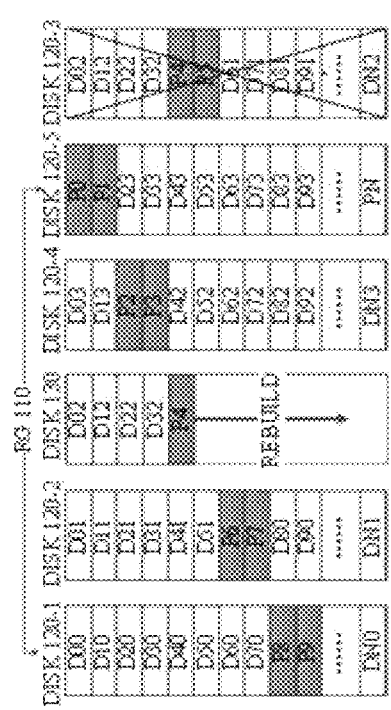
Figure 2D:
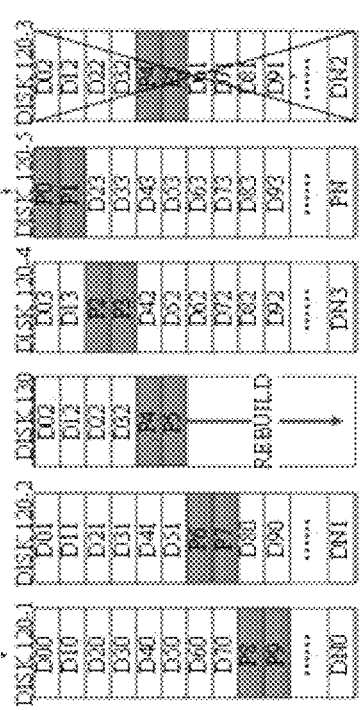

FIGS. 2A-2D illustrate schematic diagrams of specific acts in the above rebuilding process. Generally, acts for rebuilding a certain disk extent may include reading, operating and writing. For example, as shown in FIG. 2A, it is assumed that the RG 110 is about to rebuild an extent after P4. As shown in FIG. 2B, a first act to be performed is reading, namely, reading data D50, D51, D52 and D53 in a same stripe respectively from four unfaulty disks in the RG 110 (namely, disks 120-1, 120-2, 120-3, 120-4 and 120-5). Then, as shown in FIG. 2C, a certain operation (such as, XOR) can be performed on the read data to derive information (for example, D50 XOR D51 XOR D52 XOR D53 XOR=P5) stored in a respective extent of the faulty disk 120-3. At last, as shown in FIG. 2D, the operation result (such as, P5) can be written into a respective extent of the spare disk 130 to complete the rebuilding of the extent.

Through the above depiction, it can be seen that in the conventional scheme, as all of the writing operations for rebuilding the faulty disk are targeted for a same spare disk, the writing bandwidth of the spare disk will become a bottleneck of the whole rebuilding process. Besides, during the rebuilding process, the storage system may still receive random I/O requests for the faulty RG from upper-layer applications. Since the RG is being rebuilt, the response time of such random I/O requests might be affected. In addition, a large number of such random I/O requests may also cause the rebuilding process to slow down or even be interrupted. In this case, if another disk in the RG also fails, data loss might be incurred.

In order to solve the above problem and one or more of other potential problems, example embodiments of the present disclosure provide a scheme for managing a storage system. The scheme accelerates the rebuilding of the faulty disk by using a SSD with a lower Write Per Day (WPD) as a spare disk, so as to reduce the number of spare disks required by the storage system. The scheme further organizes a plurality of SSDs into a spare disk array group and allocates spare logic storage units from the spare disk array group on demand to serve for the rebuilding of the faulty disk. Therefore, the scheme can serve for rebuilding of a plurality of disk array groups simultaneously and the writing operations for rebuilding a faulty disk can be distributed to a plurality of different SSDs. Besides, the scheme further proposes a mechanism for reclaiming a spare logic storage unit and improves the utilization efficiency of a spare disk by freeing up the storage space occupied by the spare logic storage unit timely.

Figure 3:
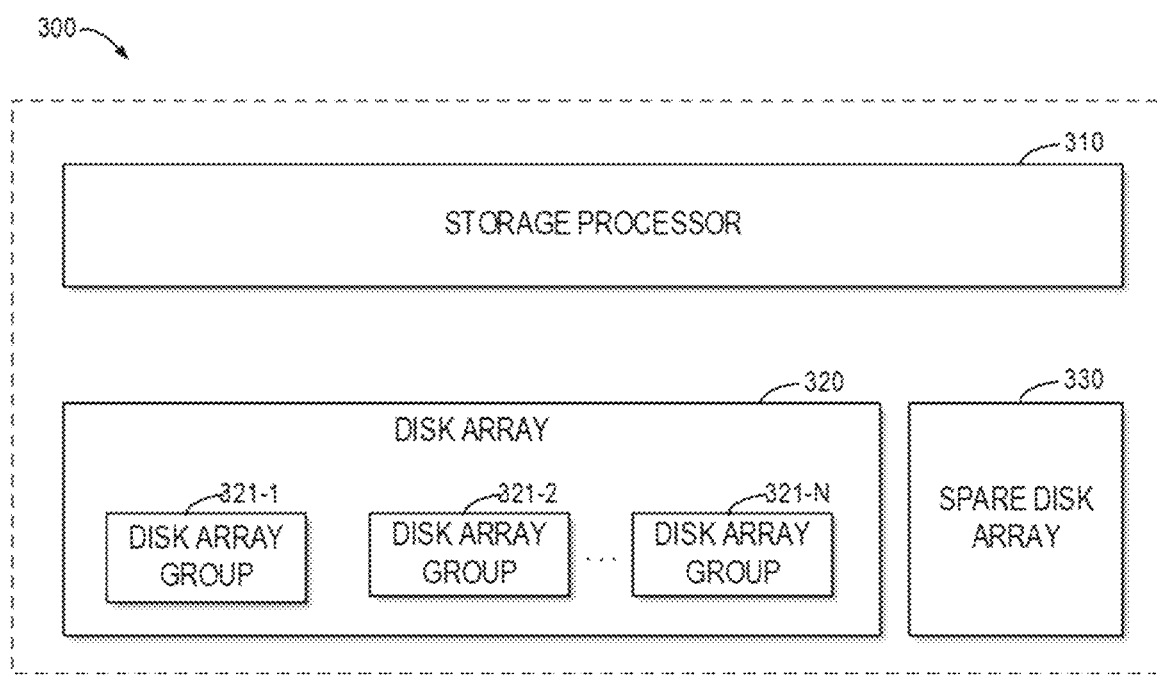
FIG. 3 illustrates an architecture diagram of a storage system 300 according to the embodiments of the present disclosure.

FIG. 3 illustrates an architecture diagram of a storage system 300 according to the embodiments of the present disclosure. As shown in FIG. 3, the storage system 300 may include a storage processor 310 and a disk array 320. It is to be understood that the structure and functions of the storage system 300 as shown in FIG. 3 are only for the purpose of illustration, without suggesting any limitations to the scope of the present disclosure. Embodiments of the present disclosure may be embodied in different structures and/or functions.

The storage processor 310 may be used to manage one or more disks. As used herein, a "disk" may refer to any non-volatile storage medium currently known or to be developed in the future, such as a magnetic disk, optical disk or solid state disk (SSD), and the like. Only for the ease of depiction, in the description of the present disclosure, a magnetic disk will be used as an example of the disk. However, it is to be understood that this is only for the ease of depiction, without suggesting any limitations to the scope of the present disclosure.

The storage processor 310, for instance, may organize one or more disks into a disk array 320 (also referred to as "storage resource pool"). The disk array 320 may include one or more disk array groups. As shown in FIG. 3, for instance, the disk array 320 may include disk array groups 321-1, 321-2, . . . , 321-N (collectively referred to as disk array group(s) 321).

The disk array 320, for instance, may be a Redundant Array of Independent Disks (RAID) which organizes a plurality of disks into a logic storage unit for the purpose of data redundancy and/or performance improvement. According to the required level of redundancy and performance, RAID may have different levels, such as RAID 0, RAID 1, . . . , RAID 5 and so on. Each of the disk array groups 121 may be consisted of a plurality of RAID stripes, each of which may include data extents for storing data and parity extents for storing parity information. Take RAID 5 with a structure of 4D+1P as an example, where each RAID stripe may include four data extents and one parity extent. In the following depiction, the structure of a RAID stripe, such as "4D+1P," may also be referred to as "width of a RAID." Generally, disk array groups in the same storage resource pool (namely, same disk array) may have the same RAID level and RAID width. In the depiction of the present disclosure, RAID 5 with a structure of 4D+1P is taken as an example for the disk array 320. However, it is to be understood that this is only for the ease of depiction, without suggesting any limitations to the scope of the present disclosure.

The storage system 300 may further include one or more spare disks for the disk array 320. As shown in FIG. 3, the storage processor 310, for instance, may organize the one or more spare disks into a spare disk array 330 to serve for the rebuilding of a faulty disk in the disk array 320. In some embodiments, when a disk in the disk array 320 fails, the storage processor 310 may allocate a respective spare logic storage unit from the spare disk array 330 to serve for the rebuilding of the faulty disk. When the user adds a disk to the storage system 300 for replacing the faulty disk, the storage processor 310 may copy data in the spare logic storage unit to the replacing disk and re-allocate the spare logic storage unit for subsequent rebuilding.

Figure 4:
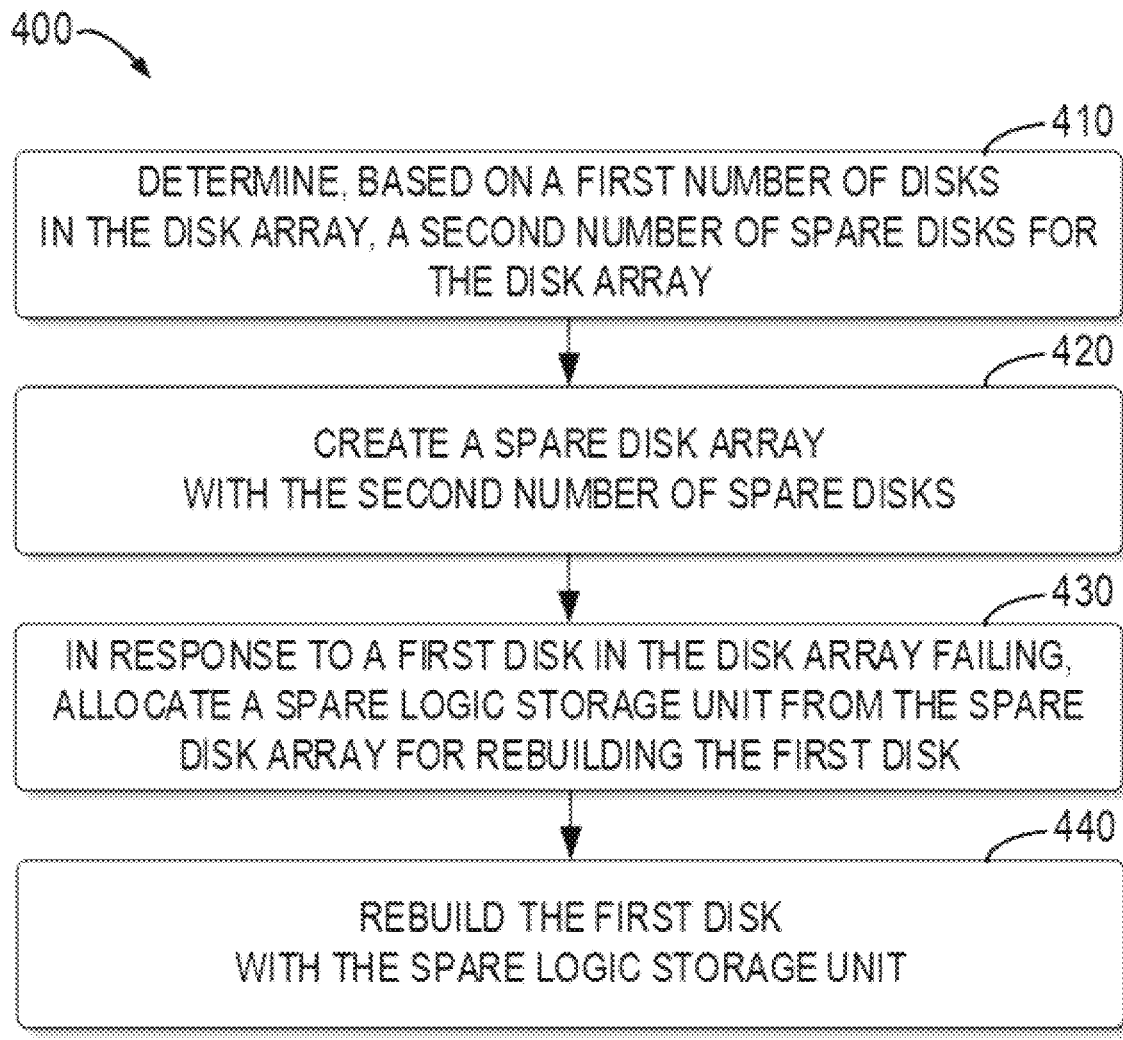
FIG. 4 illustrates a flowchart of a method 400 for managing a storage system according to the embodiments of the present disclosure.

FIG. 4 illustrates a flowchart of a method 400 for managing a storage system according to the embodiments of the present disclosure. Acts involved in the method 400 will be described below with reference to the storage system 300 as shown in FIG. 3. In some embodiments, for example, the method 400 may be implemented by the storage processor 310. It is to be understood that the method 400 may further include additional acts not shown and/or omit some shown acts, and the scope of the present disclosure is not limited in this regard.

At block 410, the storage processor 310 determines, based on the number of disks in the disk array 320 (also referred to as "first number"), a number of spare disks for the disk array 320 (also referred to as "second number").

In some embodiments, the spare disks for creating the disk array 320 may have a different type than the disks in the disk array 320. For example, the spare disks may have a relatively lower latency and a relatively higher throughput than the disks in the disk array 320, so as to accelerate the rebuilding of the faulty disk. For example, the disks in the disk array 320 may be magnetic disks while the spare disks for the disk array 320 may be SSDs. Particularly, as the spare disks in the storage system are generally only used for the rebuilding of the faulty disk, the number of I/O operations for the spare disk may be less than that for the disks. Therefore, in some embodiments, SSDs with lower WPD (for instance, 0.5 WPD or 1 WPD) can be utilized as spare disks to reduce the cost. As used herein, "WPD" refers to the number of Writes Per Day while ensuring the rated service life of SSD. A SSD with lower WPD usually costs less than a SSD with higher WPD.

In some embodiments, the second number of spare disks for creating the spare disk array 330 may be determined based on the first number of disks in the disk array 320. Assuming that in the traditional scheme, the spare disks have the same type (such as, magnetic disks) and size as the disks, the ratio of the number of spare disks and the number of disks may be 1:30. In some embodiments, as SSDs with higher throughput than the disks (such as, 10 times higher) are utilized as spare disks, the ratio of the number of spare disks and the number of disks may be, for instance, 1:300. In other words, embodiments of the present disclosure can reduce the number of spare disks required by the storage system.

At block 420, the storage processor 310 utilizes the second number of spare disks to create the disk array 330. In some embodiments, the storage processor 310 may determine the type of the spare disk array 330 based on the second number, and then create the spare disk array 330 of this type.

For instance, it is assumed that the second number of spare disks determined at block 410 is 1~4. In an embodiment, for instance, in the case of only one spare disk, the storage processor 310 may create a spare disk array 330 with the type of RAID 0. Alternatively, in the case of two spare disks, the storage processor 330 may create a spare disk array 330 with the type of RAID 0 or RAID 1. Alternatively, in another embodiment, for example, in the case of three spare disks, the storage processor 310 may create a spare disk array 330 with the type of RAID 0, RAID 1 or RAID 5. Alternatively, in still another embodiment, in the case of four spare disks, the storage processor 310 may create a spare disk array 330 with the type of RAID 0, RAID 10 (a combination of RAID 0 and RAID 10, which realizes stripe set mirroring with parity check) or RAID 5. In some embodiments, under consideration of the cost of the SSD, it is possible to create a spare disk array 330 with the type of RAID 0. In some other embodiments, to provide better data protection and provide I/O processing capability, a spare disk array 330 with the type of RAID 1 or RAID 5 may be created.

Only a part of types of the spare disk array 330 that can be created are illustrated as above only for exemplary purposes. It is to be understood that the embodiments of the present disclosure can create the spare disk array 330 with any technology currently known or to be developed in the future, and the scope of the present disclosure is not limited in this regard.

Additionally or alternatively, in some embodiments, in response to the spare disk array 330 being created, the storage processor 310 may further create a data structure for recording a state of the disk array 330. For example, the storage processor 310 may create a global list to record the states of a storage space on the spare disk array 330 being allocated, utilized, re-allocated and so on.

At block 430, in response to a failure of a disk of the disk array 320 (such as, the disk array group 321-1), the storage processor 310 may allocate a spare logic storage unit from the spare disk array 330 for rebuilding the faulty disk. The faulty disk is also referred to as "first disk" in the following depiction.

In some embodiments, the storage processor 310 may allocate a spare logic storage unit (such as, a logic unit number) with a same size as the first disk on the spare disk array 330. In some embodiments, the spare logic storage unit may provide a same device access interface as the first disk. In other words, the spare logic storage unit may be operated similarly as a physical disk.

In some embodiments, in response to failures of disks of a plurality of disk array groups in the disk array 320, the storage processor 310 may allocate a plurality of spare logic storage units from the spare disk array 330 to serve for different disk array groups.

In some embodiments, in response to the spare storage unit being allocated, the storage processor 310 may update the data structure recording the state of the spare disk array 330 accordingly, indicating that storage space corresponding to the spare storage unit is allocated.

At block 440, the storage processor 310 rebuild the faulty first disk with the spare logic storage unit. In some embodiments, as the spare logic storage unit provides the same device access interface as a physical disk, the rebuilding process may be similar to that as shown in FIGS. 1A-1D and FIGS. 2A-2D, while the only difference is that the allocated spare logic storage unit serves as the disk 130 as shown in FIGS. 1A-1D and FIGS. 2A-2D. Alternatively or additionally, in some embodiments, in response to the rebuilding process being initiated, the storage processor 310 may update the data structure recording the state of the spare disk array 330 accordingly to indicate that the storage space corresponding to the spare storage unit is being used.

Figure 5:
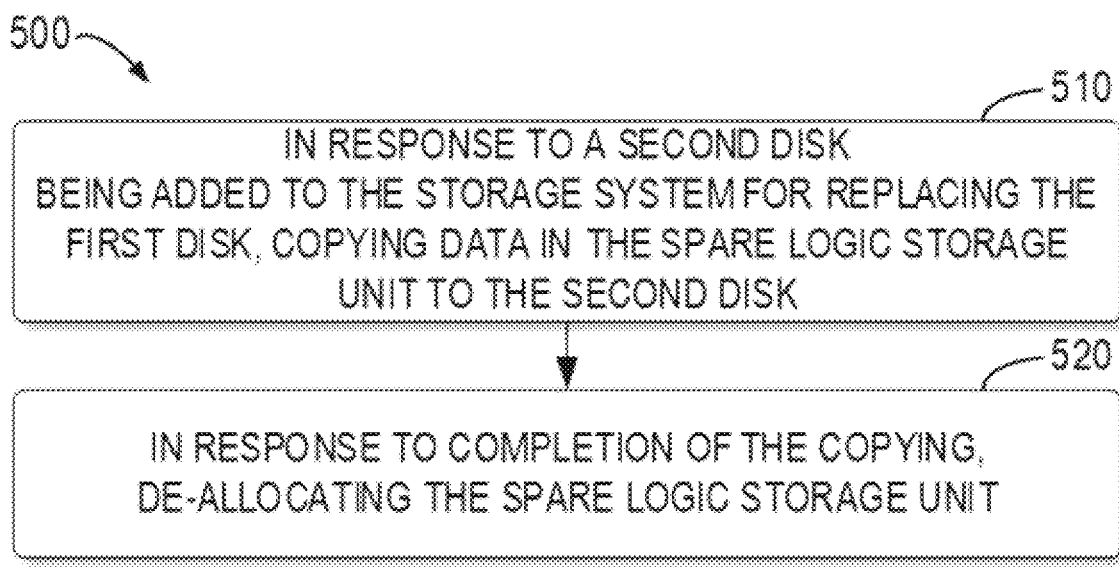
FIG. 5 illustrates a flowchart of a method 500 for re-allocating a spare logic storage unit according to the embodiments of the present disclosure.

In some embodiments, if the disk (such as, the first disk) in the disk array 320 fails, the user of the storage system 300 may receive a notice of replacing the faulty disk. In this case, if the user adds a disk to the storage system 300 for replacing the faulty disk, the storage processor 310 may copy data in the spare logic storage unit back into the replacing disk and re-allocate the storage space occupied by the spare logic storage unit timely, thereby improving the utilization efficiency of the spare disk array 330. For example, FIG. 5 illustrates a flowchart of a method 500 for re-allocating a spare logic storage unit according to the embodiments of the present disclosure. Acts involved in the method 500 will be described below with reference to the storage system 300 as shown in FIG. 3. In some embodiments, for instance, the method 500 may be implemented, for instance, by the storage processor 310. In some embodiments, for instance, the method 500 may be implemented, for instance, after the method 400. It is to be understood that the method 500 may further include additional acts not shown and/or omit some shown acts, and the scope of the present disclosure is not limited in this regard.

At block 510, in response to a disk for replacing the first disk being added to the storage system 300, the storage processor 310 copies data in the spare logic storage units to the second disk. In the following depiction, the disk for replacing the first disk is also referred to as "second disk." It is to be understood that although the data copy takes some time, as the spare logic storage unit still preserves complete copy of the original data of the first disk at that time, even if another disk in the disk array group (such as, the array group 321-1) where the first disk is located fails during the copying process, data loss will not happen.

At block 520, in response to the copying being completed, the storage processor 310 re-allocates the spare logic storage unit. In some implementations, in response to the completion of the copying, the spare logic storage unit may be removed from the disk array group 321-1 where the first disk is located, and the second disk may be added to the disk array group 321-1. Besides, the storage processor 310 may free up the storage space occupied by the spare logic storage unit, and update the data structure recording the state of the spare disk array 330 accordingly to indicate that the storage space corresponding to the spare storage unit is released.

Through the above depiction, it can be seen that the scheme according to the embodiments of the present disclosure accelerate the rebuilding of the faulty disk by using a SSD with a lower Write Per Day (WPD) as a spare disk, so as to reduce the number of spare disks required by the storage system. The scheme further organizes a plurality of SSDs into a spare disk array group and allocates spare logic storage units from the spare disk array group on demand to serve for the rebuilding of the faulty disk. Therefore, the scheme can serve for rebuilding of a plurality of disk array groups simultaneously and the writing operations for rebuilding a faulty disk can be distributed to a plurality of different SSDs. Besides, the scheme further proposes a mechanism for reclaiming a spare logic storage unit and improves the utilization efficiency of a spare disk by freeing up the storage space occupied by the spare logic storage unit timely.

Figure 6:
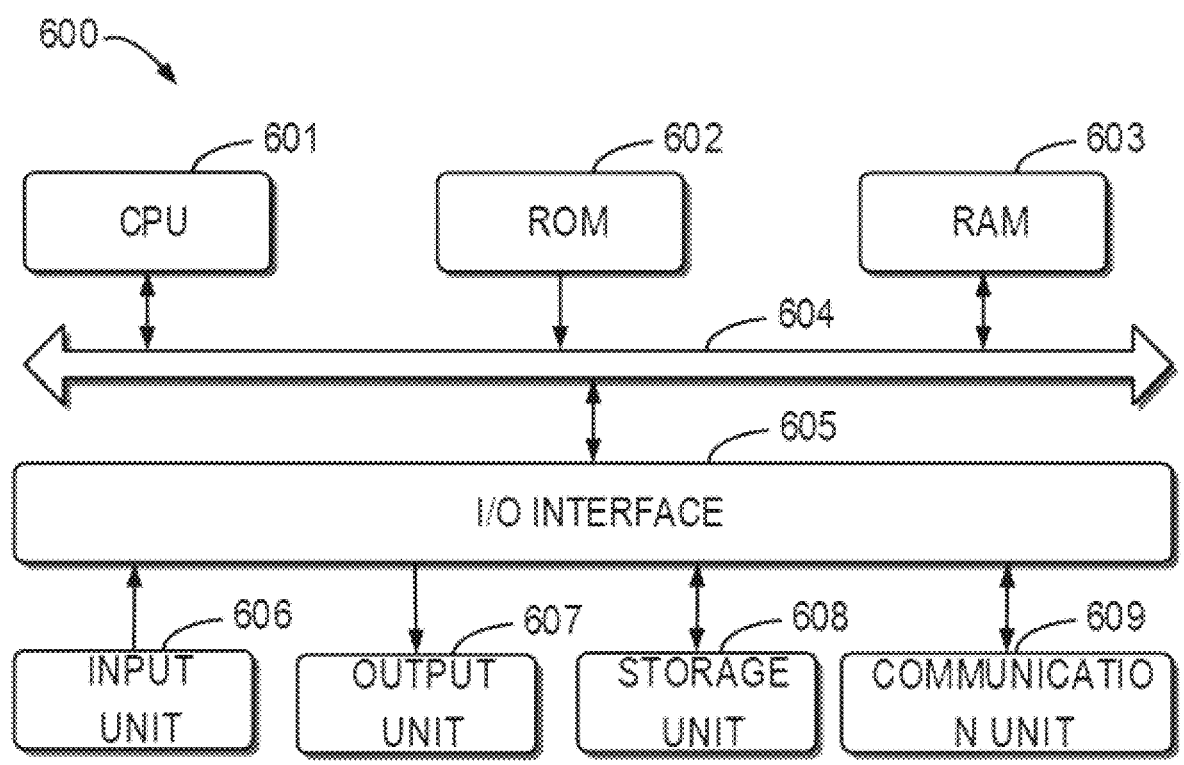
FIG. 6 illustrates a schematic block diagram of an example device 600 applicable to implement embodiments of the present disclosure.

FIG. 6 illustrates a schematic diagram of an example device 600 for implementing the embodiments of the present disclosure. For example, the storage processor 310 as shown in FIG. 3 can be implemented by the device 600. As illustrated in the FIG. 6, the device 600 comprises a central processing unit (CPU) 601 which can execute various appropriate actions and processing based on the computer program instructions stored in a read-only memory (ROM) 602 or the computer program instructions loaded into a random access memory (RAM) 603 from a storage unit 608. The RAM 603 also stores all kinds of programs and data required by operating the storage device 600. CPU 601, ROM 602 and RAM 603 are connected to each other via a bus 604 to which an input/output (I/O) interface 605 is also connected.

A plurality of components in the apparatus 600 are connected to the I/O interface 605, comprising: an input unit 606, such as keyboard, mouse and the like; an output unit 607, such as various types of displays, loudspeakers and the like; a storage unit 608, such as disk, optical disk and the like; and a communication unit 609, such as network card, modem, wireless communication transceiver and the like. The communication unit 609 allows the apparatus 600 to exchange information/data with other devices through computer networks such as Internet and/or various telecommunication networks.

Each procedure and processing as described above, such as the method 400 and/or 500, can be executed by the processing unit 601. For example, in some embodiments, the method 400 and/or 500 can be implemented as computer software programs, which are tangibly included in a machine-readable medium, such as the storage unit 608. In some embodiments, the computer program can be partially or completely loaded and/or installed to the device 600 via the ROM 602 and/or the communication unit 609. When the computer program is loaded to the RAM 603 and executed by the CPU 601, one or more steps of the above described method 400 and/or 500 are implemented.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local region network, a wide region network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local region network (LAN) or a wide region network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for managing a storage system including a disk array, the method comprising:
   determining, based on a first number of disks in the disk array, a second number of spare disks for the disk array;
   creating a spare disk array with the second number of spare disks;
   in response to a first disk in the disk array failing, allocating a spare logic storage unit from the spare disk array for rebuilding the first disk; and
   rebuilding the first disk with the spare logic storage unit;

wherein determining the second number of spare disks for the disk array includes:
  prior to the first disk in the disk array failing, providing (i) a first value as the second number of spare disks when the disks in the disk array and the spare disks are of a same type, and (ii) a second value as the second number of spare disks when the disks in the disk array and the spare disks are of different types, the first value being different from the second value; and
wherein the method further comprises:
  allocating another spare logic storage unit from the spare disk array for rebuilding the first disk, the spare logic storage unit and the other spare logic storage unit forming a plurality of spare logic storage units, data from the first disk being rebuilt on the plurality of spare logic storage units in response to the first disk in the disk array failing.

2. The method according to claim 1, wherein the spare disks and the disks in the disk array are of different types, and the spare disks have lower latency and higher throughput than the disks in the disk array.

3. The method according to claim 1, wherein the disks in the disk array include a magnetic disk and the spare disks include a solid state disk with a lower Write Per Day (WPD).

4. The method according to claim 1, wherein creating the spare disk array comprises:
  determining a type of the spare disk array based on the second number; and
  creating the spare disk array of the type.

5. The method according to claim 1, wherein allocating the spare logic storage unit comprises:
  allocating, from the spare disk array, the spare logic storage unit having a same size as the first disk.

6. The method according to claim 1, wherein allocating the spare logic storage unit comprises:
  allocating, from the spare disk array, the spare logic storage unit providing a same access interface as the first disk.

7. The method according to claim 1, further comprising:
  in response to a second disk being added to the storage system for replacing the first disk, copying data in the spare logic storage unit to the second disk; and
  in response to completion of the copying, de-allocating the spare logic storage unit.

8. The method according to claim 7, further comprising:
  in response to the spare disk array being created, creating a data structure for recording a state of the spare disk array;
  in response to the spare logic storage unit being allocated, updating the data structure; and
  in response to the spare logic storage unit being de-allocated, updating the data structure.

9. The method according to claim 1, wherein at least one of the disk array and the spare disk array includes a Redundant Array of Independent Disks (RAID).

10. The method according to claim 1, wherein the disk array performs data storage operations in accordance with a first Redundant Array of Independent Disks (RAID) level; and
wherein creating the spare disk array with the second number of spare disks includes:
  configuring the spare disk array to perform data storage operations in accordance with a second RAID level that is different from the first RAID level.

11. The method according to claim 1, wherein creating the spare disk array with the second number of spare disks includes:
  combining a plurality of solid state disks (SSDs) together to form the spare disk array, the combined plurality of SSDs forming the spare disk array being different from the disks in the disk array.

12. A device for managing a storage system including a disk array, the device comprising:
  at least one processing unit;
  at least one memory coupled to the at least one processing unit and storing instructions for execution by the at least one processing unit, the instructions, when executed by the at least one processing unit, causing the device to perform acts including:
    determining, based on a first number of disks in the disk array, a second number of spare disks for the disk array;
    creating a spare disk array with the second number of spare disks;
    in response to a first disk in the disk array failing, allocating a spare logic storage unit from the spare disk array for rebuilding the first disk; and
    rebuilding the first disk with the spare logic storage unit;
  wherein determining the second number of spare disks for the disk array includes:
    prior to the first disk in the disk array failing, providing (i) a first value as the second number of spare disks when the disks in the disk array and the spare disks are of a same type, and (ii) a second value as the second number of spare disks when the disks in the disk array and the spare disks are of different types, the first value being different from the second value; and
  wherein the acts further include:
    allocating another spare logic storage unit from the spare disk array for rebuilding the first disk, the spare logic storage unit and the other spare logic storage unit forming a plurality of spare logic storage units, data from the first disk being rebuilt on the plurality of spare logic storage units in response to the first disk in the disk array failing.

13. The device according to claim 12, wherein the spare disks and the disks in the disk array are of different types, and the spare disks have lower latency and higher throughput than the disks in the disk array.

14. The device according to claim 12, wherein the disks in the disk array include a magnetic disk and the spare disks include a solid state disk with a lower Write Per Day (WPD).

15. The device according to claim 12, wherein creating the spare disk array comprises:
  determining a type of the spare disk array based on the second number; and
  creating the spare disk array of the type.

16. The device according to claim 12, wherein allocating the spare logic storage unit comprises:
  allocating, from the spare disk array, the spare logic storage unit having a same size as the first disk.

17. The device according to claim 12, wherein allocating the spare logic storage unit comprises:
  allocating, from the spare disk array, the spare logic storage unit providing a same access interface as the first disk.

18. The device according to claim 12, wherein the acts further include:

in response to a second disk being added to the storage system for replacing the first disk, copying data in the spare logic storage unit to the second disk; and in response to completion of the copying, de-allocating the spare logic storage unit.

19. The device according to claim 18, wherein the acts further include:

in response to the spare disk array being created, creating a data structure for recording a state of the spare disk array;

in response to the spare logic storage unit being allocated, updating the data structure; and in response to the spare logic storage unit being de-allocated, updating the data structure.

20. The device according to claim 12, wherein at least one of the disk array and the spare disk array includes a Redundant Array of Independent Disks (RAID).

21. A storage system, comprising:

a disk array; and a storage processor configured to perform acts including:

determining, based on a first number of disks in the disk array, a second number of spare disks for the disk array;

creating a spare disk array with the second number of spare disks;

in response to a first disk in the disk array failing, allocating a spare logic storage unit from the spare disk array for rebuilding the first disk; and rebuilding the first disk with the spare logic storage unit;

wherein determining the second number of spare disks for the disk array includes:

prior to the first disk in the disk array failing, providing (i) a first value as the second number of spare disks when the disks in the disk array and the spare disks are of a same type, and (ii) a second value as the second number of spare disks when the disks in the disk array and the spare disks are of different types, the first value being different from the second value; and wherein the acts further include:

allocating another spare logic storage unit from the spare disk array for rebuilding the first disk, the spare logic storage unit and the other spare logic storage unit forming a plurality of spare logic storage units, data from the first disk being rebuilt on the plurality of spare logic storage units in response to the first disk in the disk array failing.

22. The storage system according to claim 21, wherein the spare disks and the disks in the disk array are of different types, and the spare disks have lower latency and higher throughput than the disks in the disk array.

23. The storage system according to claim 21, wherein at least one of the disk array and the spare disk array includes a Redundant Array of Independent Disks (RAID).

* * * * *